(12) United States Patent
Cleaver et al.

(10) Patent No.: US 11,080,655 B2
(45) Date of Patent: Aug. 3, 2021

(54) MACHINE LEARNING TECHNICAL SUPPORT SELECTION

(71) Applicant: INTERNATIONAL BUSINESS MACHINES CORPORATION, Armonk, NY (US)

(72) Inventors: James D. Cleaver, Grose Wold (AU); Stefan Harrer, Victoria (AU); Laurence J. Plant, North Balwyn (AU)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 15/916,399

(22) Filed: Mar. 9, 2018

(65) Prior Publication Data
US 2019/0279159 A1    Sep. 12, 2019

(51) Int. Cl.
| | |
|---|---|
| G06Q 10/10 | (2012.01) |
| G06Q 10/06 | (2012.01) |
| G06F 8/30 | (2018.01) |
| G06F 8/65 | (2018.01) |
| G06N 20/00 | (2019.01) |
| G06F 16/435 | (2019.01) |

(52) U.S. Cl.
CPC .......... *G06Q 10/1053* (2013.01); *G06F 8/30* (2013.01); *G06F 8/65* (2013.01); *G06F 16/436* (2019.01); *G06N 20/00* (2019.01); *G06Q 10/063112* (2013.01)

(58) Field of Classification Search
CPC ........ G06Q 10/1053; G06Q 10/063112; G06F 16/436; G06F 8/30; G06F 8/65; G06F 11/3668; G06N 20/00
See application file for complete search history.

(56) References Cited

U.S. PATENT DOCUMENTS

| | | |
|---|---|---|
| 6,917,952 B1 | 7/2005 | Dailey et al. |
| 8,117,024 B2 | 2/2012 | Dane |
| | (Continued) | |

OTHER PUBLICATIONS

Khan, Tabrez. "Resume Ranking using NLP and Machine Learning." (2016). (Year: 2016).*

(Continued)

*Primary Examiner* — Lynda Jasmin
*Assistant Examiner* — Corey Russ
(74) *Attorney, Agent, or Firm* — Schmeiser, Olsen & Watts; Nicholas L. Cadmus (57) ABSTRACT

A method and system for improving a machine learning technical support applicant selection process is provided. The method includes retrieving and analyzing, in real time, job role data, resume based data, and sensor data associated with a plurality of individuals. A specialized memory repository is generated within a specified portion of a hardware memory device and results of the analysis are stored within the specialized memory repository. Self-learning software code for executing a job applicant selection process is generated and a plurality of current resumes and previously generated time-based resumes are retrieved for current job applicants for a specified position. The current resumes are analyzed with respect to the previously generated time-based resumes and associated inconsistencies are determined. A first job applicant is selected and the self-learning software code is modified.

12 Claims, 6 Drawing Sheets

(56) References Cited

U.S. PATENT DOCUMENTS

| | | | |
|---|---|---|---|
| 2003/0177027 A1* | 9/2003 | DiMarco | G06Q 10/1053 705/321 |
| 2006/0287970 A1* | 12/2006 | Chess | G06Q 10/10 |
| 2011/0106550 A1 | 5/2011 | Skelton | |
| 2012/0311462 A1* | 12/2012 | Devecka | G06Q 30/0273 715/753 |
| 2015/0074773 A1* | 3/2015 | Bacastow | H04L 63/12 726/4 |
| 2015/0235181 A1 | 8/2015 | Chen et al. | |
| 2015/0363744 A1* | 12/2015 | Dugan | G06Q 10/1053 705/321 |
| 2015/0366518 A1* | 12/2015 | Sampson | A61B 5/0478 600/301 |
| 2016/0071061 A1* | 3/2016 | Biddle | G06Q 10/1053 705/321 |
| 2016/0139791 A1* | 5/2016 | McConnell | H04L 67/306 715/745 |
| 2017/0286914 A1* | 10/2017 | Fang | G06Q 10/105 |
| 2018/0000563 A1* | 1/2018 | Shanjani | A61B 5/4818 |
| 2018/0032944 A1* | 2/2018 | Sarvana | G06Q 10/063114 |
| 2018/0307750 A1* | 10/2018 | Gupta | G06F 16/337 |
| 2018/0341903 A1* | 11/2018 | Keen | G06Q 10/063114 |
| 2019/0220824 A1* | 7/2019 | Liu | G06Q 10/1053 |
| 2019/0312800 A1* | 10/2019 | Schibler | G06F 8/65 |
| 2019/0392355 A1* | 12/2019 | O'Malley | G06Q 10/00 |

OTHER PUBLICATIONS

Altini, Marco, et al. "Self-calibration of walking speed estimations using smartphone sensors." 2014 IEEE International Conference on Pervasive Computing and Communication Workshops (Percom Workshops). IEEE, 2014.) (Year: 2014).*

Rabcan, Jan, Monika Vaclavkova, and Rudolf Blasko. "Selection of appropriate candidates for a type position using C4. 5 decision tree." 2017 International Conference on Information and Digital Technologies (IDT). IEEE, 2017. (Year: 2017).*

Menascé, Daniel A., and Hassan Gomaa. "A method for design and performance modeling of client/server systems." IEEE transactions on software engineering 26.11 (2000): 1066-1085. (Year: 2000).*

Zubeda, Juneja Afzal Ayub et al.; Resume Ranking using NLP and Machine Learning; Project Report submitted in fulfillment of the requirements for the degree of Bachelor of Engineering, Department of Computer Engineering, School of Engineering and Technology, Anjuman-I_Islam's Kalsekar Technical Campus; Academic Year 2015-2016; 41 pages.

* cited by examiner

MACHINE LEARNING TECHNICAL SUPPORT SELECTION

FIELD

The present invention relates generally to a method for monitoring and selecting technical support with respect to a user and in particular to a method and associated system for improving technical support software technology associated with enabling sensors for detecting attributes of a user and executing associated selection actions for automatically generating and modifying associated software code instructions.

BACKGROUND

Accurately selecting support resolutions typically includes an inaccurate process with little flexibility. Controlling and modifying software associated with selecting support resolutions may include a complicated process that may be time consuming and require a large amount of resources. Accordingly, there exists a need in the art to overcome at least some of the deficiencies and limitations described herein above.

SUMMARY

A first aspect of the invention provides a machine learning technical support applicant selection improvement method comprising: retrieving, by a processor of a server hardware device from a cloud based storage system, job role data associated with job roles of a plurality of individuals; retrieving, by the processor, resume based data associated with resumes of the plurality of individuals; retrieving, by the processor from a plurality of sensors of mobile devices of the plurality of individuals, sensor data associated with attributes of the plurality of individuals; first analyzing in real time, by the processor executing natural language software code, the job role data, the resume based data, and the sensor data; generating, by the processor, a specialized memory repository within a specified portion of a hardware memory device; storing, by the processor within the specialized memory repository, results of the first analyzing; generating, by the processor from the results of the first analyzing, self-learning software code for executing a job applicant selection process; retrieving, by the processor, a plurality of current resumes for a plurality of current job applicants for a specified position; retrieving, by the processor, a plurality of previously generated time based resumes for the plurality of current job applicants for the specified position; second analyzing in real time, by the processor executing the self-learning software code and the natural language software code, the plurality of current resumes with respect to the previously generated time based resumes and the results of the first analyzing; determining, by the processor based on results of the second analyzing, inconsistencies between the plurality of current resumes and the previously generated time based resumes; selecting by the processor based on results of the second analyzing and the inconsistencies, a first job applicant of the plurality of current job applicants; and modifying, by the processor based on the results of the second analyzing, the self-learning software code.

A second aspect of the invention provides a computer program product, comprising a computer readable hardware storage device storing a computer readable program code, the computer readable program code comprising an algorithm that when executed by a processor of a server hardware device implements a machine learning technical support applicant selection improvement method, the method comprising: retrieving, by the processor from a cloud based storage system, job role data associated with job roles of a plurality of individuals; retrieving, by the processor, resume based data associated with resumes of the plurality of individuals; retrieving, by the processor from a plurality of sensors of mobile devices of the plurality of individuals, sensor data associated with attributes of the plurality of individuals; first analyzing in real time, by the processor executing natural language software code, the job role data, the resume based data, and the sensor data; generating, by the processor, a specialized memory repository within a specified portion of a hardware memory device; storing, by the processor within the specialized memory repository, results of the first analyzing; generating, by the processor from the results of the first analyzing, self-learning software code for executing a job applicant selection process; retrieving, by the processor, a plurality of current resumes for a plurality of current job applicants for a specified position; retrieving, by the processor, a plurality of previously generated time based resumes for the plurality of current job applicants for the specified position; second analyzing in real time, by the processor executing the self-learning software code and the natural language software code, the plurality of current resumes with respect to the previously generated time based resumes and the results of the first analyzing; determining, by the processor based on results of the second analyzing, inconsistencies between the plurality of current resumes and the previously generated time based resumes; selecting by the processor based on results of the second analyzing and the inconsistencies, a first job applicant of the plurality of current job applicants; and modifying, by the processor based on the results of the second analyzing, the self-learning software code.

A third aspect of the invention provides a server hardware device comprising a processor coupled to a computer-readable memory unit, the memory unit comprising instructions that when executed by the computer processor implements a machine learning technical support applicant selection improvement method comprising: retrieving, by the processor from a cloud based storage system, job role data associated with job roles of a plurality of individuals; retrieving, by the processor, resume based data associated with resumes of the plurality of individuals; retrieving, by the processor from a plurality of sensors of mobile devices of the plurality of individuals, sensor data associated with attributes of the plurality of individuals; first analyzing in real time, by the processor executing natural language software code, the job role data, the resume based data, and the sensor data; generating, by the processor, a specialized memory repository within a specified portion of a hardware memory device; storing, by the processor within the specialized memory repository, results of the first analyzing; generating, by the processor from the results of the first analyzing, self-learning software code for executing a job applicant selection process; retrieving, by the processor, a plurality of current resumes for a plurality of current job applicants for a specified position; retrieving, by the processor, a plurality of previously generated time based resumes for the plurality of current job applicants for the specified position; second analyzing in real time, by the processor executing the self-learning software code and the natural language software code, the plurality of current resumes with respect to the previously generated time based resumes and the results of the first analyzing; determining, by the processor based on results of the second analyzing, inconsistencies between the plurality of current resumes and the previously generated time based resumes; selecting by the processor based on results of the second analyzing and the inconsistencies, a first job applicant of the plurality of current job applicants; and modifying, by the processor based on the results of the second analyzing, the self-learning software code.

The present invention advantageously provides a simple method and associated system capable of accurately selecting support resolutions.

DETAILED DESCRIPTION

Figure 1:
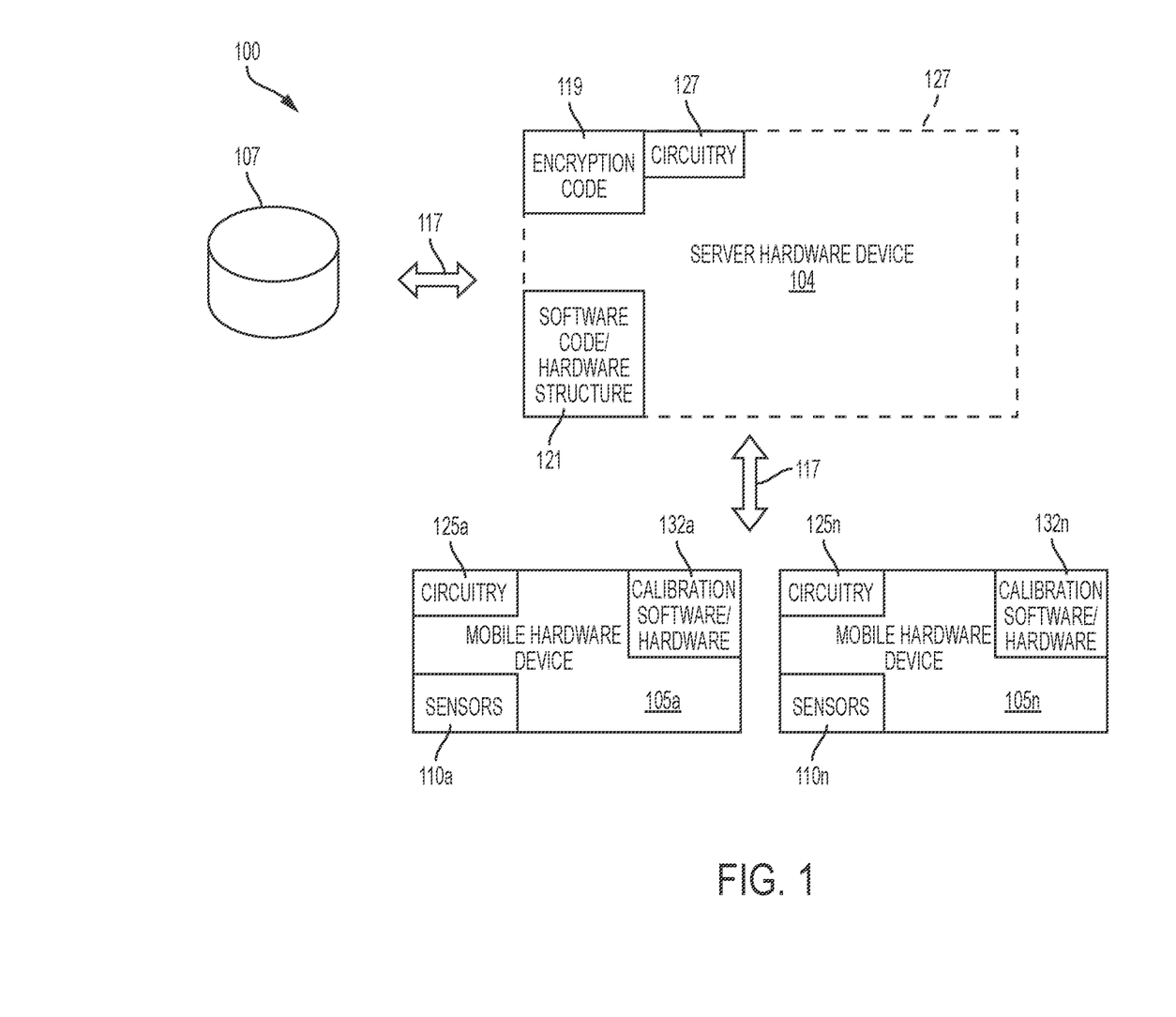
FIG. 1 illustrates a system for improving technical support software technology associated with enabling sensors for detecting attributes of a user and executing associated user selection actions associated with automatically generating and modifying associated software code instructions, in accordance with embodiments of the present invention.

FIG. 1 illustrates a system 100 for improving technical support software technology associated with enabling sensors for detecting attributes of a user and executing associated user selection actions associated with automatically generating and modifying associated software code instructions, in accordance with embodiments of the present invention. System 100 enables a machine learning system for ingesting and analyzing (in real time) digital resumes from job applicants over a specified time period. During a software training process, system 100 ingests sample job profiles for training the software to recognize attributes associated with different professions including, inter alfa, roles, responsibilities, and experiences with respect to different domains such as, inter alfa, quantitative (e.g., a number of years in a band, a number of people managed, a duration of projects managed, etc.) and qualitative (e.g., personal attributes associated with a profession). Additionally (during a software training process), system 100 ingests and reviews sample resumes in combination with analysis from an experienced recruiter.

During execution/operation, system 100 ingests applicant resumes and executes natural language software code to develop a digital view of the applicant including:
1. Potential gaps or weaknesses such as missing or overlapping dates.
2. A comparison with earlier resumes from a same applicant.
3. Questions to ask.
4. A comparison with competing candidates.
5. Analysis and recommended candidate rating.

System 100 digitally analyzes job skills and areas of expertise to determine changes over time. Therefore, metadata describing associated with skills, expertise, and experience is modified to change over time. System 100 executes machine learning and natural language code to analyze the changes and maintain a metadata data model and associated database for presenting acquired skills over time thereby enabling system 100 to continue to run automatically (i.e., with no human intervention) and support longitudinal checking code (e.g., an applicant claiming to have developed a skill that did not exist at that point in time).

System 100 creates images representing an applicant and an associated role and uses image analysis code to compare images and identify similarities and differences. For example, a specified skill may be represented as a symbol or icon and a size, shape, and/or color may be modified to reflect a level of skill and experience. Additionally, the symbols or icons may be arranged and presented in chronological order to depict how skills were adopted and improved over time.

System digitally removes bias from decisions. Bias is defined herein as conscious or unconscious subjectivity caused by presentation and usage of language. System 100 is configured to map language of the resume into common metadata models and image formats, thereby normalizing resume data and removing bias.

System 100 may include the following example components:
1. A mobile device comprising a camera and/or a scanner.
2. A processing unit executing analytics algorithms and displaying results in real-time.
3. A network link to a cloud system to draw additional information with respect to the applicant and to add to the information provided in a resume.

System 100 of FIG. 1 includes a server hardware device 104 (i.e., specialized hardware device), mobile hardware devices 105a . . . 105n (i.e., specialized hardware device), and a database system 107 (e.g., a cloud based system) interconnected through a network 117. Server hardware device 104 includes specialized circuitry 127 (that may include specialized software), encryption code 119 (for encrypting any output), and software code/hardware structure 121. Mobile hardware devices 105a . . . 105n may include personals device provided to all job applicant users. Mobile hardware devices 105a . . . 105n may be Bluetooth enabled to provide connectivity to technical support systems. Mobile hardware devices 105a . . . 105n include specialized circuitry 125a . . . 125n (that may include specialized software), calibration software/hardware 132a . . . 132n, and sensors 110a . . . 110n. Sensors 110a . . . 110n may include any type of internal or external sensors including, inter alia, a heart rate monitor, a blood pressure monitor, a temperature sensor, a pulse rate monitor, an ultrasonic sensor, an optical sensor, a video retrieval device, humidity sensors, etc. Calibration software/hardware 132a . . . 132n may include specialized testing circuitry/logic. Server hardware device 104, mobile hardware devices 105a . . . 105n, and database system 107a . . . 107n may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, mobile hardware devices 105a . . . 105n, and database system 107a . . . 107n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving technical support software technology associated with enabling sensors for detecting attributes of a user and executing associated user selection actions associated with automatically generating and modifying associated software code instructions. Network 117 may include any type of network including, inter alia, a local area network, (LAN), a wide area network (WAN), the Internet, a wireless network, etc. Alternatively, network 117 may include an application programming interface (API).

System 100 comprises a machine learning system which ingests and analyses resumes from job applicants over time. Natural language code is applied to associated job profiles and resumes. Profiles for applicants are generated based on an understanding of the applicants and suitability for a role. If an applicant has supplied more than one resume over time, a consistency check between the content of each resume is determined and associated risks, inconsistencies, and questions are determined.

Figure 2:
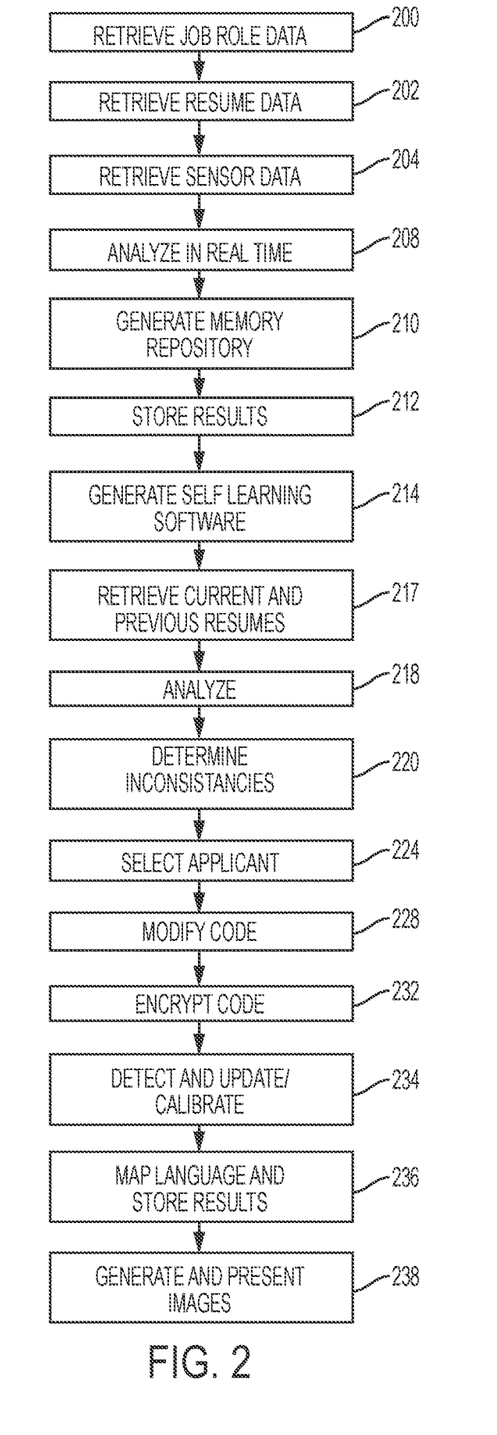
FIG. 2 illustrates an algorithm detailing a process flow enabled by the system of FIG. 1 for improving technical support software technology associated with enabling sensors for detecting attributes of a user and executing associated user selection actions associated with automatically generating and modifying associated software code instructions, in accordance with embodiments of the present invention.

FIG. 2 illustrates an algorithm detailing a process flow enabled by system 100 of FIG. 1 for improving technical support software technology associated with enabling sensors for detecting attributes of a user and executing associated user selection actions associated with automatically generating and modifying associated software code instructions, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and mobile hardware devices 105a . . . 105n. In step 200, job role data associated with job roles of a plurality of individuals is retrieved (by a server hardware device) from a cloud based storage system. In step 202, resume based data associated with resumes of the plurality of individuals; is retrieved. In step 204, sensor data associated with attributes of the plurality of individuals is retrieved from a plurality of sensors of mobile devices of the plurality of individuals. In step 208, the job role data, resume based data, and sensor data is analyzed in real time via execution of natural language software code. In step 210, a specialized memory repository is generated within a specified portion of a hardware memory device. In step 212, results of the analysis of step 208 are stored within the specialized memory repository. In step 214, self-learning software code for executing a job applicant selection process is generated. In step 217, current resumes and previously generated time-based resumes for current job applicants (for a specified position) are retrieved. In step 218, the current resumes are analyzed with respect to the previously generated time-based resumes (and said results of the analysis of step 208) in real time via execution of the self-learning software code and the natural language software code. In step 220, inconsistencies between the current resumes and the previously generated time-based resumes are determined. In step 224, a first job applicant of the current job applicants is selected based on the inconsistencies and the results of the analysis of step 218. In step 228, the self-learning software code is modified based on the results of the analysis of step 218. In step 232, the self-learning software code is encrypted resulting in an encrypted self-learning software application. The encrypted self-learning software application is transmitted to the mobile hardware devices. In step 234, biometric levels of the current job applicants are automatically detected via sensor devices of mobile hardware devices of the current job applicants. The self learning software code may be automatically updated based on the biometric levels. Additionally, a calibration error of a sensor device may be automatically detected and in response the sensor device may be automatically calibrated. The calibration process may include calibrating software and/or hardware of the sensor devices. Additionally, images of the current job applicants may be automatically retrieved and analyzed via multiple video retrieval devices of the mobile hardware devices of the current job applicants. In step 236, language of the current resumes is mapped into common metadata models and associated images. The language of the current resumes mapped to the common metadata models and associated images is stored within the specialized memory repository. In step 238, images representing skills of the current job applicants are automatically generated and presented via graphical user interfaces. The images may include specified icons that comprise differing sizes, shapes, and colors each indicating differing skill levels and experience levels of each of the current job applicants. The specified icons are automatically arranged in a chronological order to depict how skills of the current job applicants have been adopted and improved over time.

Figure 3:
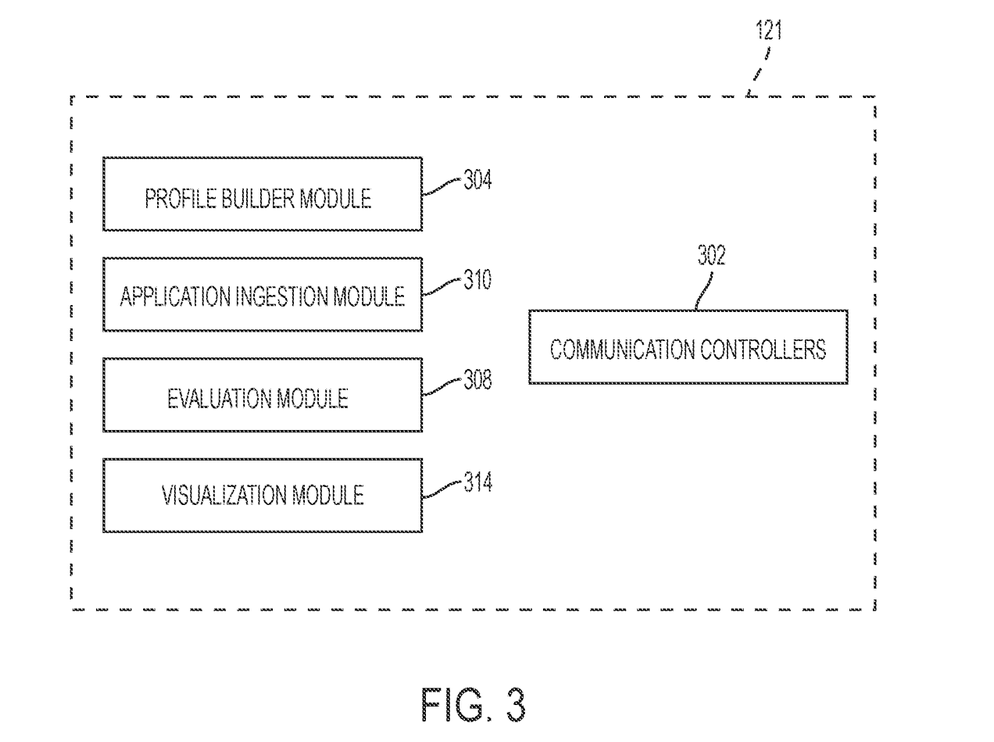
FIG. 3 illustrates an internal structural view of the software code/hardware structure of FIG. 1, in accordance with embodiments of the present invention.

FIG. 3 illustrates an internal structural view of software code/hardware structure 121 of FIG. 1, in accordance with embodiments of the present invention. Software code/hardware structure 121 includes a profile builder module 304, an application ingestion module 310, an evaluation module 308, a visualization module 314, and communication controllers 302. Profile builder module 304 reads job role descriptions and generates profile software including skills and responsibilities of a technical role. The profile may be represented as graphical software providing editing tools for modifying then profile. The profiles may be stored as an indexed repository for supporting export/input and software execution. Additionally, profiles defined by alternative sources may be added to a job description repository. Application ingestion module 310 is configured to read applicant resumes and build a profile application comprising associated skills, experiences, attributes, responsibilities, timelines, employment history, and interests. The profile application may be represented as graphical software for providing editing tools for manipulating the profile application. The profile application may be stored in an indexed repository. Application ingestion module 310 is configured to identify and compare precedent resumes from a same candidate to identify differences. Evaluation module 308 is configured to evaluate graph and text comparison maps applicant profiles with respect to job role profiles in order to identify strengths, weaknesses, gaps and additional capabilities of applicants with respect to a role. Visualization module 314 is configured to generate a user interface for:
1. Ingesting job role descriptions and building a profile repository.
2. Ingesting sample resumes.
3. Providing preliminary results for review via usage of the graph editing tools to tune system operation.

System operation is enabled to ingest a set of applicant resumes for review. The review process identifies candidates suited and unsuited for the technical job roles. Communication controllers 302 are enabled for controlling all communications between profile builder module 304, application ingestion module 310, evaluation module 308, and a visualization module 314.

Figure 4:
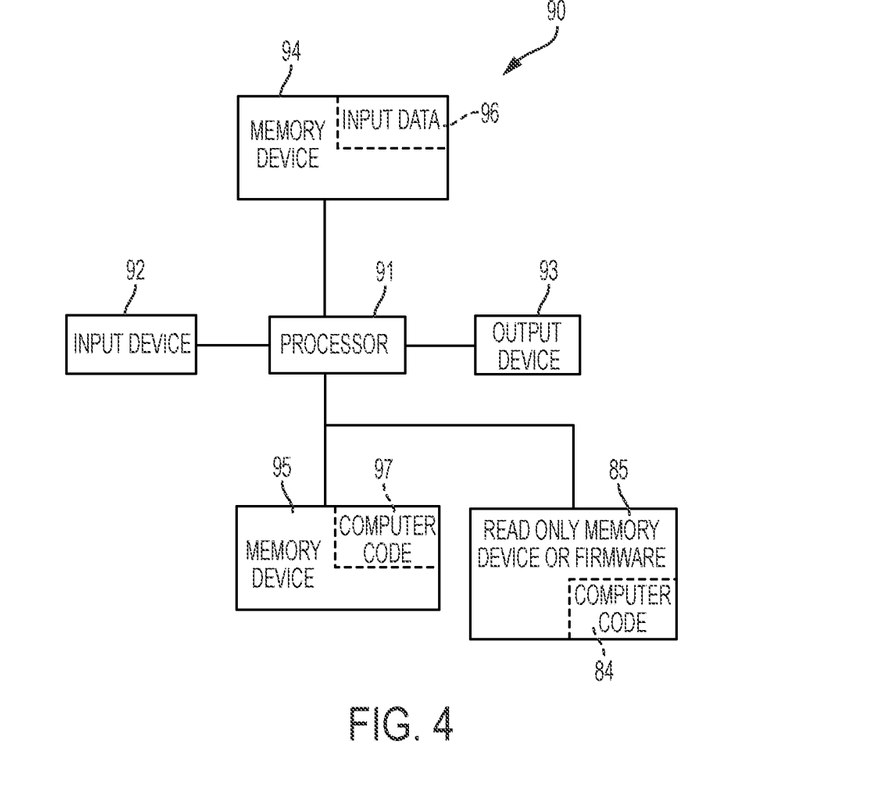
FIG. 4 illustrates a computer system used by the system of FIG. 1 for improving technical support software technology associated with enabling sensors for detecting attributes of a user and executing associated user selection actions associated with automatically generating and modifying associated software code instructions, in accordance with embodiments of the present invention.

FIG. 4 illustrates a computer system 90 (e.g., mobile hardware devices 105a . . . 105n and/or server hardware device 104 of FIG. 1) used by or comprised by the system of FIG. 1 for improving technical support software technology associated with enabling sensors for detecting attributes of a user and executing associated user selection actions associated with automatically generating and modifying associated software code instructions, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving technical support software technology associated with enabling sensors for detecting attributes of a user and executing associated user selection actions associated with automatically generating and modifying associated software code instructions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve technical support software technology associated with enabling sensors for detecting attributes of a user and executing associated user selection actions associated with automatically generating and modifying associated software code instructions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving technical support software technology associated with enabling sensors for detecting attributes of a user and executing associated user selection actions associated with automatically generating and modifying associated software code instructions. In another embodiment, the invention provides a business method that performs the process steps of the invention on a subscription, advertising, and/or fee basis. That is, a service supplier, such as a Solution Integrator, could offer to enable a process for improving technical support software technology associated with enabling sensors for detecting attributes of a user and executing associated user selection actions associated with automatically generating and modifying associated software code instructions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
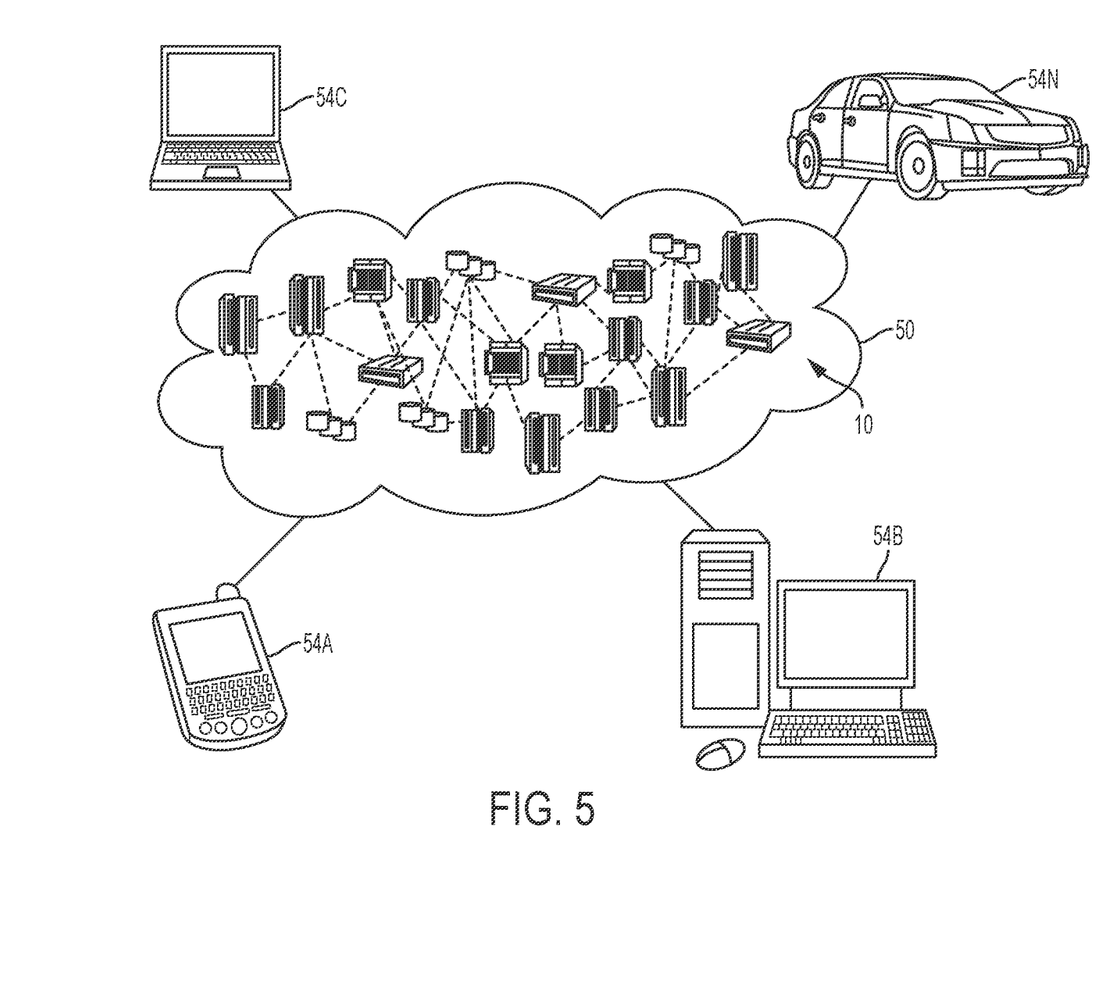
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
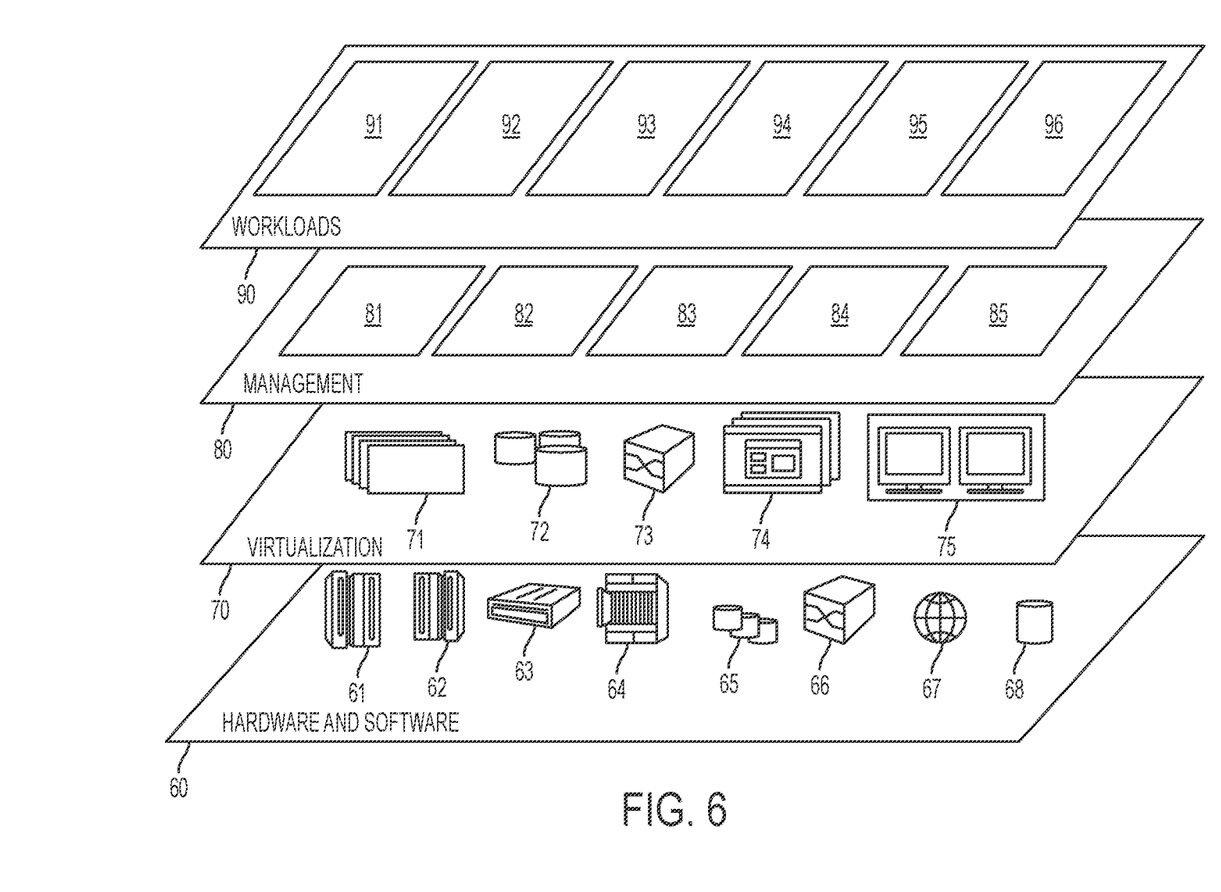
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving technical support software technology associated with enabling sensors for detecting attributes of a user and executing associated user selection actions associated with automatically generating and modifying associated software code instructions 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning technical support applicant selection improvement method comprising:
retrieving, by a processor of a server hardware device from a cloud based storage system, job role data associated with job roles of a plurality of individuals;
retrieving, by said processor, resume based data associated with resumes of said plurality of individuals;
retrieving, by said processor from a plurality of sensors of mobile devices of said plurality of individuals, sensor data associated with attributes of said plurality of individuals;
first analyzing in real time, by said processor executing natural language software code, said job role data, said resume based data, and said sensor data, wherein results of said first analyzing indicate a digital view of potential gaps or weaknesses comprising missing or overlapping dates associated with said resumes of said plurality of individuals;
generating, by said processor, a specialized memory repository within a specified portion of a hardware memory device;
storing, by said processor within said specialized memory repository, results of said first analyzing;
generating, by said processor from said results of said first analyzing, self-learning software code for executing a job applicant selection process;
retrieving, by said processor, a plurality of current resumes for a plurality of current job applicants for a specified position;
retrieving, by said processor, a plurality of previously generated time-based resumes for said plurality of current job applicants for said specified position;
automatically detecting, by said processor via a plurality of biometric sensor devices of mobile hardware devices of said plurality of current job applicants, biometric levels of said plurality of current job applicants, wherein said plurality of biometric sensor devices comprise a heart rate monitor, a blood pressure monitor, a temperature sensor, a pulse rate monitor, an ultrasonic sensor, an optical sensor, a video retrieval device, and humidity sensors;
second analyzing in real time, by said processor executing said self-learning software code and said natural language software code with respect to said biometric levels, said plurality of current resumes with respect to said previously generated time-based resumes and said results of said first analyzing;
determining, by said processor based on results of said second analyzing, inconsistencies between said plurality of current resumes and said previously generated time-based resumes thereby causing said processor to monitor and review personal attributes associated with a profession with respect to said plurality of current job applicants and depict how associated skills of said plurality of current job applicants have been adopted and improved over time;
maintaining, by said processor, a metadata data model and associated database for presenting acquired skills, of said plurality of current job applicants, with respect to time;
executing, by said processor, support longitudinal checking code with respect to said metadata model resulting in a determination that an applicant of said plurality of current job applicants has claimed to have developed a skill that did not exist at a point in time;
selecting by said processor based on results of said executing, said second analyzing, and said inconsistencies, a first job applicant of said plurality of current job applicants;
automatically retrieving, by said processor via multiple video retrieval devices, video images of said first applicant;
generating, by said processor, images representing said first applicant and an associated role; wherein said images comprise said video images and symbols representing specified skills of said first applicant;
comparing, by said processor executing image analysis code, said images to determine similarities and differences between said images, wherein said similarities and differences are represented by sizes, shapes, and colors indicating differing skill levels and experience levels of each of said plurality of current job applicants;
modifying, by said processor, a size, shape, and color of said symbols to reflect levels of skills and experience of said first applicant;
presenting by said processor, said symbols in chronological order to depict how said skills and experience were adopted and improved over time;
enabling, by said processor, graph editing tools providing preliminary results of said selecting resulting in system operation of said server hardware being tuned to run automatically with no human intervention;
modifying, by said processor based on said results of said second analyzing, said self-learning software code, wherein said modifying comprises digitally removing bias and subjectivity, associated with presentation and usage of language of said plurality of current resumes, from said self learning software code;
automatically detecting by said processor, a calibration error of at least one sensor device of said plurality of biometric sensor devices; and
automatically calibrating, by said processor, software and hardware of said at least one sensor device.

2. The method of claim 1, further comprising:
encrypting, by said processor, said self-learning software code resulting in an encrypted self-learning software application; and
transmitting, by said processor, said encrypted self-learning software application to said plurality of mobile hardware devices.

3. The method of claim 1, further comprising:
automatically updating, by said processor based on said biometric levels, said self-learning software code.

4. The method of claim 1, further comprising:
mapping, by said processor, language of said plurality of current resumes into common metadata models and associated images; and
storing, by said processor, within said specialized memory repository, said language of said plurality of current resumes mapped to said common metadata models and associated images.

5. The method of claim 1, further comprising:
automatically retrieving, by said processor via a plurality video retrieval devices of mobile hardware devices of said plurality of current job applicants, images of said plurality of current job applicants, wherein said second analyzing is further based on said images.

6. The method of claim 1, further comprising:
automatically generating, by said processor, images representing skills of said plurality of current job applicants;
presenting, by said processor via a plurality of graphical user interfaces, said images comprising a plurality of specified icons comprising a plurality of differing sizes, shapes, and colors each indicating differing skill levels and experience levels of each of said plurality of current job applicants; and
automatically arranging, by said processor, plurality of specified icons in a chronological order to depict how skills of said plurality of current job applicants have been adopted and improved over time.

7. The method of claim 1, further comprising:
providing at least one support service for at least one of creating, integrating, hosting, maintaining, and deploying computer-readable code in the control hardware, said code being executed by the computer processor to implement: said retrieving said job role data, said retrieving said resume based data, said retrieving said sensor data, said first analyzing, said generating said specialized memory repository, said storing, said generating said self-learning software code, said retrieving said plurality of current resumes, said retrieving said plurality of previously generated time based resumes, said second analyzing, said determining, said selecting, and said modifying.

8. A computer program product, comprising a computer readable hardware storage device storing a computer readable program code, said computer readable program code comprising an algorithm that when executed by a processor of a server hardware device implements a machine learning technical support applicant selection improvement method, said method comprising:
retrieving, by said processor from a cloud based storage system, job role data associated with job roles of a plurality of individuals;
retrieving, by said processor, resume based data associated with resumes of said plurality of individuals;
retrieving, by said processor from a plurality of sensors of mobile devices of said plurality of individuals, sensor data associated with attributes of said plurality of individuals;
first analyzing in real time, by said processor executing natural language software code, said job role data, said resume based data, and said sensor data, wherein results of said first analyzing indicate a digital view of potential gaps or weaknesses comprising missing or overlapping dates associated with said resumes of said plurality of individuals;
generating, by said processor, a specialized memory repository within a specified portion of a hardware memory device;
storing, by said processor within said specialized memory repository, results of said first analyzing;
generating, by said processor from said results of said first analyzing, self-learning software code for executing a job applicant selection process;
retrieving, by said processor, a plurality of current resumes for a plurality of current job applicants for a specified position;
retrieving, by said processor, a plurality of previously generated time-based resumes for said plurality of current job applicants for said specified position;
automatically detecting, by said processor via a plurality of biometric sensor devices of mobile hardware devices of said plurality of current job applicants, biometric levels of said plurality of current job applicants, wherein said plurality of biometric sensor devices comprise a heart rate monitor, a blood pressure monitor, a temperature sensor, a pulse rate monitor, an ultrasonic sensor, an optical sensor, a video retrieval device, and humidity sensors;
second analyzing in real time, by said processor executing said self-learning software code and said natural language software code with respect to said biometric levels, said plurality of current resumes with respect to said previously generated time-based resumes and said results of said first analyzing;
determining, by said processor based on results of said second analyzing, inconsistencies between said plurality of current resumes and said previously generated time-based resumes thereby causing said processor to monitor and review personal attributes associated with a profession with respect to said plurality of current job applicants and depict how associated skills of said plurality of current job applicants have been adopted and improved over time;
maintaining, by said processor, a metadata data model and associated database for presenting acquired skills, of said plurality of current job applicants, with respect to time;
executing, by said processor, support longitudinal checking code with respect to said metadata model resulting in a determination that an applicant of said plurality of current job applicants has claimed to have developed a skill that did not exist at a point in time;
selecting by said processor based on results of said executing, said second analyzing, and said inconsistencies, a first job applicant of said plurality of current job applicants;
automatically retrieving, by said processor via multiple video retrieval devices, video images of said first applicant;
generating, by said processor, images representing said first applicant and an associated role; wherein said images comprise said video images and symbols representing specified skills of said first applicant;
comparing, by said processor executing image analysis code, said images to determine similarities and differences between said images, wherein said similarities and differences are represented by sizes, shapes, and colors indicating differing skill levels and experience levels of each of said plurality of current job applicants;

modifying, by said processor, a size, shape, and color of said symbols to reflect levels of skills and experience of said first applicant;

presenting by said processor, said symbols in chronological order to depict how said skills and experience were adopted and improved over time;

enabling, by said processor, graph editing tools providing preliminary results of said selecting resulting in system operation of said server hardware being tuned to run automatically with no human intervention;

modifying, by said processor based on said results of said second analyzing, said self-learning software code, wherein said modifying comprises digitally removing bias and subjectivity, associated with presentation and usage of language of said plurality of current resumes, from said self learning software code;

automatically detecting by said processor, a calibration error of at least one sensor device of said plurality of biometric sensor devices; and automatically calibrating, by said processor, software and hardware of said at least one sensor device.

9. The computer program product of claim 8, wherein said method further comprises:

encrypting, by said processor, said self-learning software code resulting in an encrypted self-learning software application; and transmitting, by said processor, said encrypted self-learning software application to said plurality of mobile hardware devices.

10. The computer program product of claim 9, wherein said method further comprises:

automatically updating, by said processor based on said biometric levels, said self- learning software code.

11. The computer program product of claim 8, wherein said method further comprises:

mapping, by said processor, language of said plurality of current resumes into common metadata models and associated images; and storing, by said processor, within said specialized memory repository, said language of said plurality of current resumes mapped to said common metadata models and associated images.

12. A server hardware device comprising a processor coupled to a computer-readable memory unit, said memory unit comprising instructions that when executed by the computer processor implements a machine learning technical support applicant selection improvement method comprising:

retrieving, by said processor from a cloud based storage system, job role data associated with job roles of a plurality of individuals;

retrieving, by said processor, resume based data associated with resumes of said plurality of individuals;

retrieving, by said processor from a plurality of sensors of mobile devices of said plurality of individuals, sensor data associated with attributes of said plurality of individuals;

first analyzing in real time, by said processor executing natural language software code, said job role data, said resume based data, and said sensor data, wherein results of said first analyzing indicate a digital view of potential gaps or weaknesses comprising missing or overlapping dates associated with said resumes of said plurality of individuals;

generating, by said processor, a specialized memory repository within a specified portion of a hardware memory device;

storing, by said processor within said specialized memory repository, results of said first analyzing;

generating, by said processor from said results of said first analyzing, self-learning software code for executing a job applicant selection process;

retrieving, by said processor, a plurality of current resumes for a plurality of current job applicants for a specified position;

retrieving, by said processor, a plurality of previously generated time-based resumes for said plurality of current job applicants for said specified position;

automatically detecting, by said processor via a plurality of biometric sensor devices of mobile hardware devices of said plurality of current job applicants, biometric levels of said plurality of current job applicants, wherein said plurality of biometric sensor devices comprise a heart rate monitor, a blood pressure monitor, a temperature sensor, a pulse rate monitor, an ultrasonic sensor, an optical sensor, a video retrieval device, and humidity sensors;

second analyzing in real time, by said processor executing said self-learning software code and said natural language software code with respect to said biometric levels, said plurality of current resumes with respect to said previously generated time-based resumes and said results of said first analyzing;

determining, by said processor based on results of said second analyzing, inconsistencies between said plurality of current resumes and said previously generated time-based resumes thereby causing said processor to monitor and review personal attributes associated with a profession with respect to said plurality of current job applicants and depict how associated skills of said plurality of current job applicants have been adopted and improved over time;

maintaining, by said processor, a metadata data model and associated database for presenting acquired skills, of said plurality of current job applicants, with respect to time;

executing, by said processor, support longitudinal checking code with respect to said metadata model resulting in a determination that an applicant of said plurality of current job applicants has claimed to have developed a skill that did not exist at a point in time;

selecting by said processor based on results of said executing, said second analyzing, and said inconsistencies, a first job applicant of said plurality of current job applicants;

automatically retrieving, by said processor via multiple video retrieval devices, video images of said first applicant;

generating, by said processor, images representing said first applicant and an associated role; wherein said images comprise said video images and symbols representing specified skills of said first applicant;

comparing, by said processor executing image analysis code, said images to determine similarities and differences between said images, wherein said similarities and differences are represented by sizes, shapes, and colors indicating differing skill levels and experience levels of each of said plurality of current job applicants;

modifying, by said processor, a size, shape, and color of said symbols to reflect levels of skills and experience of said first applicant;

presenting by said processor, said symbols in chronological order to depict how said skills and experience were adopted and improved over time;

enabling, by said processor, graph editing tools providing preliminary results of said selecting resulting in system operation of said server hardware being tuned to run automatically with no human intervention;

modifying, by said processor based on said results of said second analyzing, said self-learning software code, wherein said modifying comprises digitally removing bias and subjectivity, associated with presentation and usage of language of said plurality of current resumes, from said self learning software code;

automatically detecting by said processor, a calibration error of at least one sensor device of said plurality of biometric sensor devices; and automatically calibrating, by said processor, software and hardware of said at least one sensor device.

* * * * *